United States Patent
Kim et al.

(10) Patent No.: US 8,194,971 B2
(45) Date of Patent: Jun. 5, 2012

(54) ROBOT MOTION DATA GENERATION METHOD AND A GENERATION APPARATUS USING IMAGE DATA

(75) Inventors: Robertyoungchul Kim, Glenview, IL (US); Wooyeol Kim, Suwon-si (KR); Hyunseung Son, Dangjin-gun (KR); Joonghee Han, Daejeon (KR)

(73) Assignees: KMC Robotics Co., Ltd., Tamnip-Dong, Yuseong-Gu Daejeon (KR); Hongik University Industry-Academic Cooperation Foundation, Sangsu-Dong, Mapo-Gu Seoul (KR)

( * ) Notice: Subject to any disclaimer, the term of this patent is extended or adjusted under 35 U.S.C. 154(b) by 531 days.

(21) Appl. No.: 12/484,390

(22) Filed: Jun. 15, 2009

(65) Prior Publication Data
US 2010/0135572 A1    Jun. 3, 2010

(30) Foreign Application Priority Data
Dec. 2, 2008    (KR) .................. 10-2008-0120891

(51) Int. Cl.
*G06K 9/00* (2006.01)
(52) U.S. Cl. .................. 382/153; 382/103; 382/104
(58) Field of Classification Search .................. 382/103, 382/104, 107, 190, 195, 199, 201, 203, 204, 382/205, 206, 216, 293–297; 901/1–50
See application file for complete search history.

(56) References Cited

U.S. PATENT DOCUMENTS
3,502,882 A  *  3/1970  Von Voros .................. 250/202
* cited by examiner Primary Examiner — Brian Le
(74) Attorney, Agent, or Firm — Lexyoume IP Group, PLLC

(57) ABSTRACT

The present invention relates to a robot motion data generation method and a generation apparatus using image data, and more specifically to a robot action data generation method for perceiving motion of an object from a consecutive first image frame and a second image frame including image information on the moving object, and for generating robot action data from the perceived motion, comprising the steps of: a first step of performing digital markings at plural spots on top of the object of the first image frame, and storing first location coordinates values of the digital markings in tree type; a second step of storing peripheral image patterns of each digital marking in association with the first location coordinates values; a third step of recognizing image data identical with peripheral image patterns of each of the first location coordinates values from the second image frame, and finding out changed second location coordinates values from the first location coordinates values; a fourth step of extracting angle changes of each location coordinates value from the first location coordinates values and the second location coordinates values; a fifth step of converting extracted angles into motion templates; and a sixth step of generating robot action data from the motion templates.

7 Claims, 8 Drawing Sheets

FIG. 5

| Leg Number | | Frame 1 | Frame 2 | Frame 3 |
|---|---|---|---|---|
| 1 | Joint 1 | Θ + 0 (S=0) | Θ + 2 (S=5) | Θ + 3 (S=5) |
| | Joint 2 | Θ + 0 (S=0) | Θ + 2 (S=0) | Θ + 2 (S=0) |
| | Joint 3 | Θ + 0 (S=0) | Θ − 2 (S=5) | Θ − 2 (S=0) |
| 2 | Joint 1 | Θ + 0 (S=0) | Θ + 0 (S=0) | Θ + 0 (S=0) |
| | Joint 2 | Θ + 0 (S=0) | Θ + 2 (S=5) | Θ + 2 (S=0) |
| | Joint 3 | Θ + 0 (S=0) | Θ + 0 (S=0) | Θ + 0 (S=0) |
| 3 | Joint 1 | Θ + 0 (S=0) | Θ + 2 (S=5) | Θ + 3 (S=5) |
| | Joint 2 | Θ + 0 (S=0) | Θ + 1 (S=5) | Θ + 1 (S=0) |
| | Joint 3 | Θ + 0 (S=0) | Θ + 0 (S=0) | Θ + 0 (S=0) |

ROBOT MOTION DATA GENERATION METHOD AND A GENERATION APPARATUS USING IMAGE DATA

BACKGROUND OF THE INVENTION

1. Field of the Invention

The present invention relates to a robot motion data generation method and a generation apparatus for processing motion of a robot, and more specifically to a method for generating robot motion data and a generation apparatus by conducting digital markings at equivalent object joint positions of a first image frame with the use of plural consecutive image frames (moving pictures) including a moving object, and by extracting moving angle values of each joint through motion of the digital markings.

2. Description of the Related Art

A prior method for generating motion data was to attach plural sensors directly to an object for obtaining its motion, and to sense location changes of the sensors by analyzing signals inputted from the sensors, thereby measuring locations, directions and others of each joint.

Another method was to attach particular markers to an object, and to manually find out location changes of the markers from consecutive frames by using a camera, so as to obtain changed locations and directions of each joint.

However, though the above methods can exactly obtain action data, a lot of equipments and costs are needed to obtain one motion, thus they are hardly used for robot development, and mainly used for movies or animation. Furthermore, since the prior inventions are directly attached to an object, they are mainly applied to human bodies, and it is very difficult to apply them to animals, particularly, small insects.

As for technologies regarding motion data generation in the case of general robot development, the most frequently used method is to make a user use a tool for generating angles by directly inputting joint values of a robot. In this case, a robot developer should individually apply each angle for motion generation, requiring a lot of time and effort.

Another method is to obtain angles by directly moving a robot with the use of a motor capable of receiving feedback. While it is easy to obtain motion through this method, a lot of expenses are required for the motor, and when another type of an actuator is used instead of the motor, application is difficult.

SUMMARY OF THE INVENTION

It is therefore an object of the present invention to provide a robot motion generation method and a generation apparatus using image data for extracting motion data even without directly attaching separate sensors to an object by using consecutive image frames (moving pictures) including motion of the object, and for applying the extracted motion data to robot motion data.

Also, it is an object of the present invention to provide a robot motion data generation method and a generation apparatus using image data for suggesting a method of extracting motion data of animals, insects and others, to which motion sensors are not attachable, and for applying the suggested method to robot motion data.

To accomplish the above object, the present invention provides a robot action data generation method for perceiving motion of an object from a consecutive first image frame, a second image frame, . . . , and an Nth image frame including image information on the moving object, and for generating robot action data from the perceived motion, comprising the steps of: a first step of performing digital markings at plural spots on top of the object of the first image frame, and storing first location coordinates values of the digital markings in tree type; a second step of storing peripheral image patterns of each digital marking in association with the first location coordinates values; a third step of recognizing image data identical with peripheral image patterns of each of the first location coordinates values from the second image frame, and finding out changed second location coordinates values from the first location coordinates values; a fourth step of extracting angle changes of each location coordinates value from the first location coordinates values and the second location coordinates values; a fifth step of converting extracted angles into motion templates; a sixth step of repeatedly applying the second step to the fifth step up to the Nth image frame; and a seventh step of generating robot action data from the motion templates.

To achieve another object, the present invention provides a robot action data generation apparatus for perceiving motion of an object from a consecutive first image frame, a second image frame, . . . , and an Nth image frame including image information on the moving object, and for generating robot action data from the perceived motion, comprising: a first memory for storing image data consisting of plural frames; a second memory for performing digital markings for image data which constitutes the first image frame stored in the first memory, and storing first location coordinates values of the digital markings and peripheral image patterns of each digital marking in association with the first location coordinates values; and an operation processor for finding out changed second location coordinates values from the first location coordinates values by recognizing image data identical with the peripheral image patterns of each of the first location coordinates values from the first image frame and the consecutive second image frame, extracting angle changes of each location coordinates value from the first location coordinates values and the second location coordinates values, converting the extracted angles into motion templates, and for generating robot action data from the motion templates.

In the above hardware configuration, it is possible to configure the first memory and the second memory as one memory, or to separate the second memory into a 2-1st memory for storing the first location coordinates values and a 2-2nd memory for storing the peripheral image patterns. That is, various transformations may exist for operation forms of these memories. Such transformation examples are easily known to those skilled in the art, thus detailed explanations would be omitted.

Like mentioned so far, robot action generation of the present invention has an advantage of being applicable to robot development by bringing action data of various individual humans, animals, and insects. Besides, compared to a prior motion capture method, the present invention does not need a complex environmental configuration, so it can be available at any place without additional costs, thereby remarkably cutting down robot development expenses.

The generated motion data of the present invention can be flexibly usable by a reference value, rather than by a determined value, being widely applicable to various robot development fields without being limited to a particular robot action development field only.

BRIEF DESCRIPTION OF THE DRAWINGS

The advantages of the invention will become readily apparent to those skilled in the art from the following detailed description of a preferred embodiment when considered in the light of the accompanying drawings, in which:

FIG. 5 is a format diagram showing a motion template generated by the present invention.

DETAILED DESCRIPTION OF PREFERRED EMBODIMENTS

Hereinafter, advantages, features, and the preferred embodiments of the present invention will be fully described in reference to the accompanied drawings.

Figure 1:
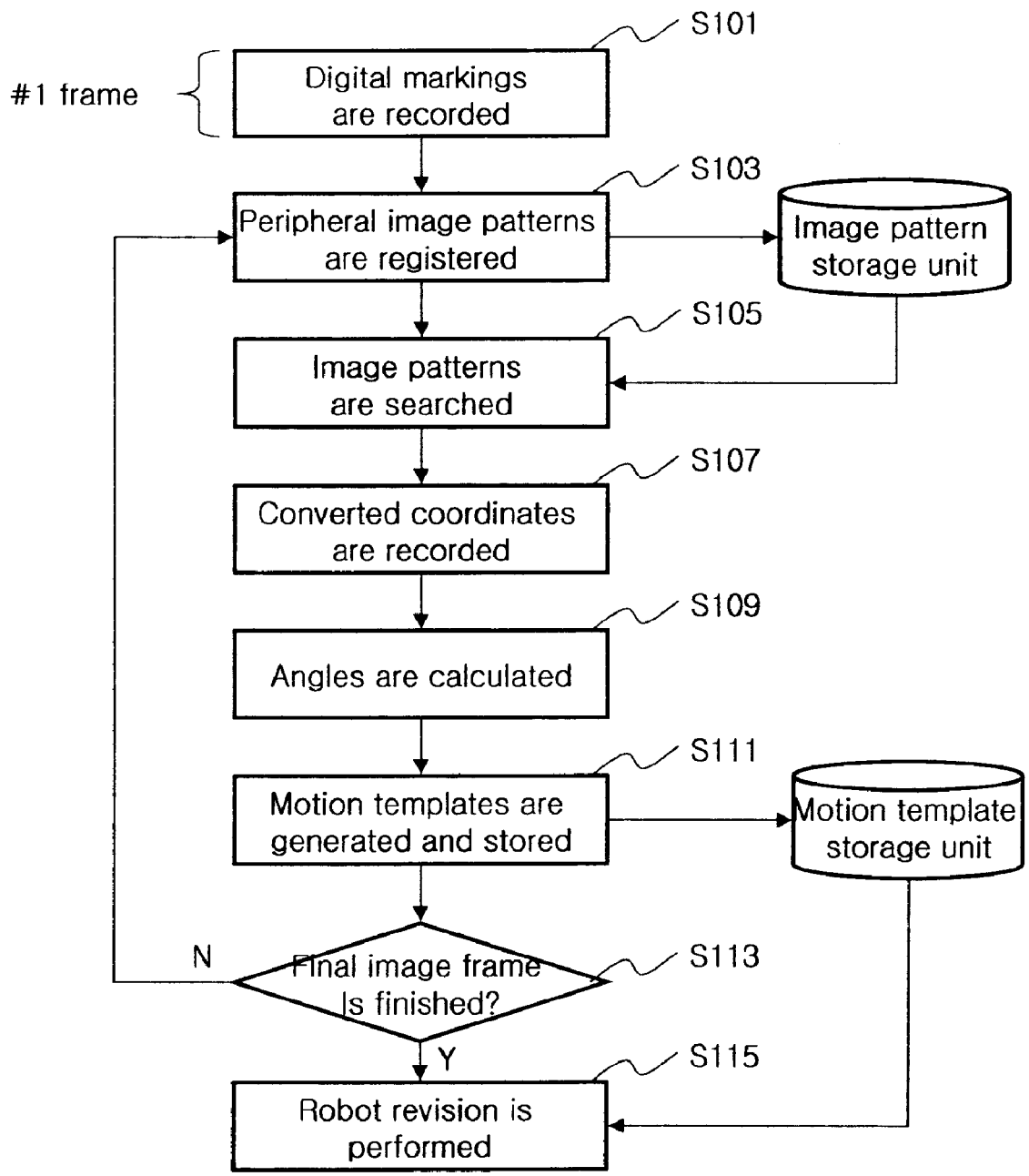
FIG. 1 shows one embodiment in accordance with the present invention, illustrating an overall flowchart for generating robot motion data from image data.

FIG. 1 shows one embodiment in accordance with the present invention, illustrating an overall flowchart for generating robot motion data from image data. The image data means a taken moving picture consisting of consecutive frames including a moving object. For explanatory convenience, the frames would be configured into a first image frame, a second image frame, . . . and an Nth image frame. A user performs digital markings for image data of the first image frame, and tracks motion of each joint (S101). The digital markings mean that a left upper end of an image frame is considered as a starting point of xy 2-dimensional coordinates, and that location coordinates values of digital markings displayed on each joint shown on the image frame are stored. When the user performs the digital markings, location coordinates values (called 'first location coordinates' for explanatory convenience) of each marking are managed through IDs, and each of the generated digital markings is managed in tree type from a central point.

Image information around the location coordinates of each of the digitally marked IDs is patterned, and peripheral image patterns are stored in a memory together with the IDs (S103). That is to say, the location coordinates values of the markings and the related peripheral image patterns are stored by using the IDs.

When such a preparation process is finished, image patterns identical with the peripheral image patterns of each of the first location coordinates values are searched and recognized from the second image frame, and changed second location coordinates values of the first location coordinates values of the first image frame are found out (S105 and S107). Quantities of angle changes of each marking are extracted from the first location coordinates values and the second location coordinates values of each digital marking (S109), and the corresponding location coordinates values are stored in motion templates (S111).

If processing for a final image frame is not completed (S113), a step 'S103' is carried out. Namely, the peripheral image patterns for each ID on the second image frame are stored in a peripheral image pattern storage unit (S103). The steps 'S103' to 'S111' are executed on the third image frame by using the peripheral image patterns and the location coordinates values on the second image frame of each ID, and the motion templates are updated. When location coordinates conversion of each marking is progressed until the final Nth image frame through such a method, the motion templates are completed, and revision is performed to apply the completed motion templates to a robot (S115), then revised data is applied to robot motion.

Figure 2:
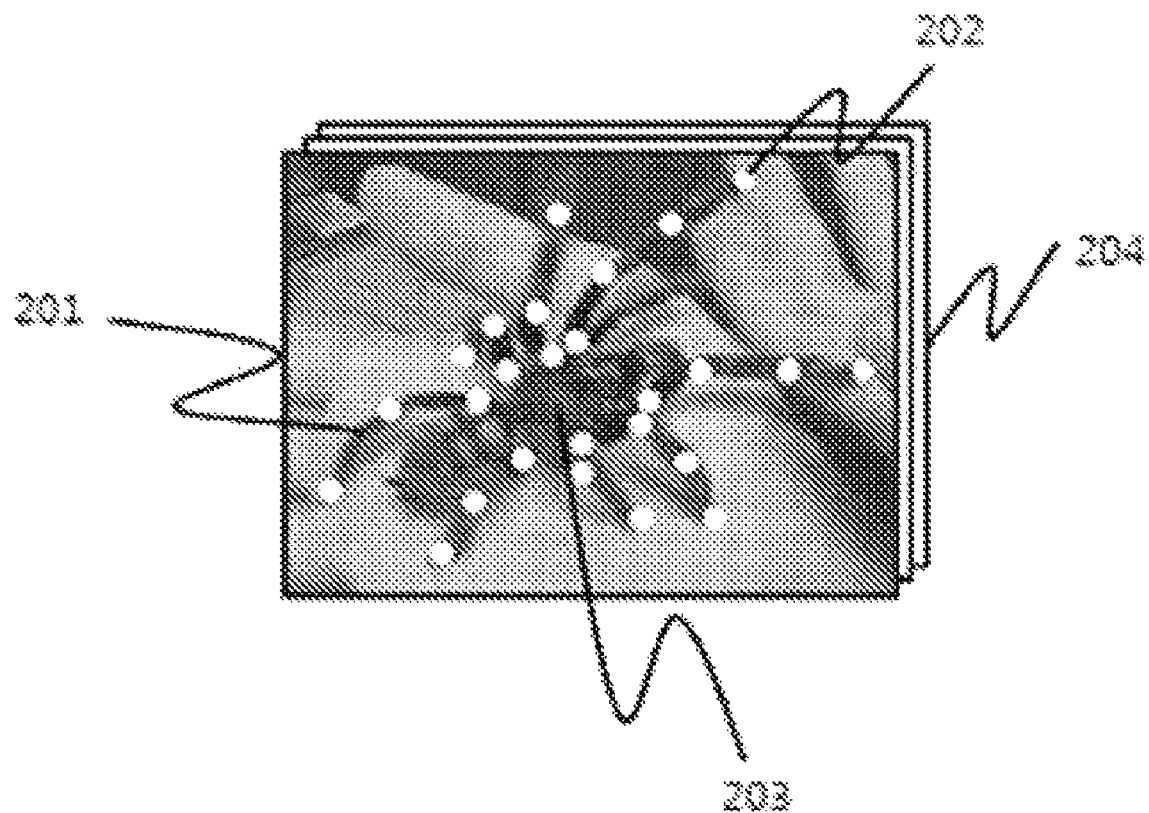
FIG. 2 is one embodiment of the present invention, showing a format diagram illustrating digital markings on one image frame.

FIG. 2 is one embodiment of the present invention, showing a format diagram illustrating digital markings on one image frame. Like shown in FIG. 2, digital markings (202) are conducted on essential joints of a target object (201) by using a first image frame from image data consisting of plural image frames (204). When the digital markings (202) are done, a system in accordance with the present invention assigns IDs to each digital marking, and stores peripheral image patterns and location coordinates values of each ID (digital marking) in tree type based on a central point (203). The central point is to revise locations of the digital markings (202) in the image data by tracking motion of the target object (203).

The process of storing in the tree type will be simply described as follows. Like shown in FIG. 2, it can be known that, based on the central point (203), the target object (201) has eight legs and each leg is composed of three joints. Since it is impossible to decide whether the legs are eight or the joints are three through simple markings, such information is given in the tree type. This can be expressed in Table 1.

TABLE 1

Central point(object)
   leg 1
      joint 1
      joint 2
      joint 3
   leg 2
   . . . .
   leg N When certain parts equal to the corresponding image patterns are searched from the consecutive image frames (204) by using the stored peripheral image patterns, it is available to find out location coordinates values to which the corresponding digital markings (202) move.

Figure 3A:
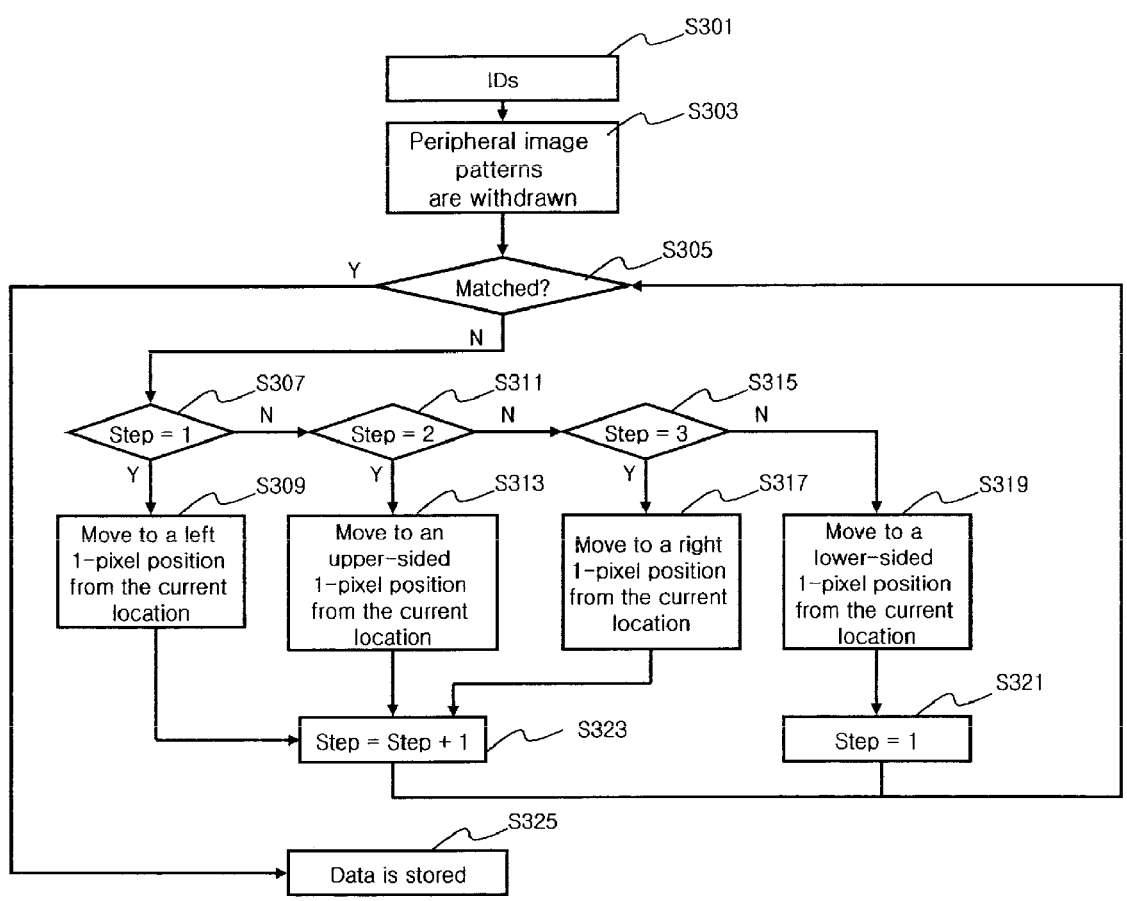
FIGS. 3a and 3b are block diagrams illustrating a flow of searching changes of location coordinates values by tracking digital markings on image data of the present invention.
Figure 3B:
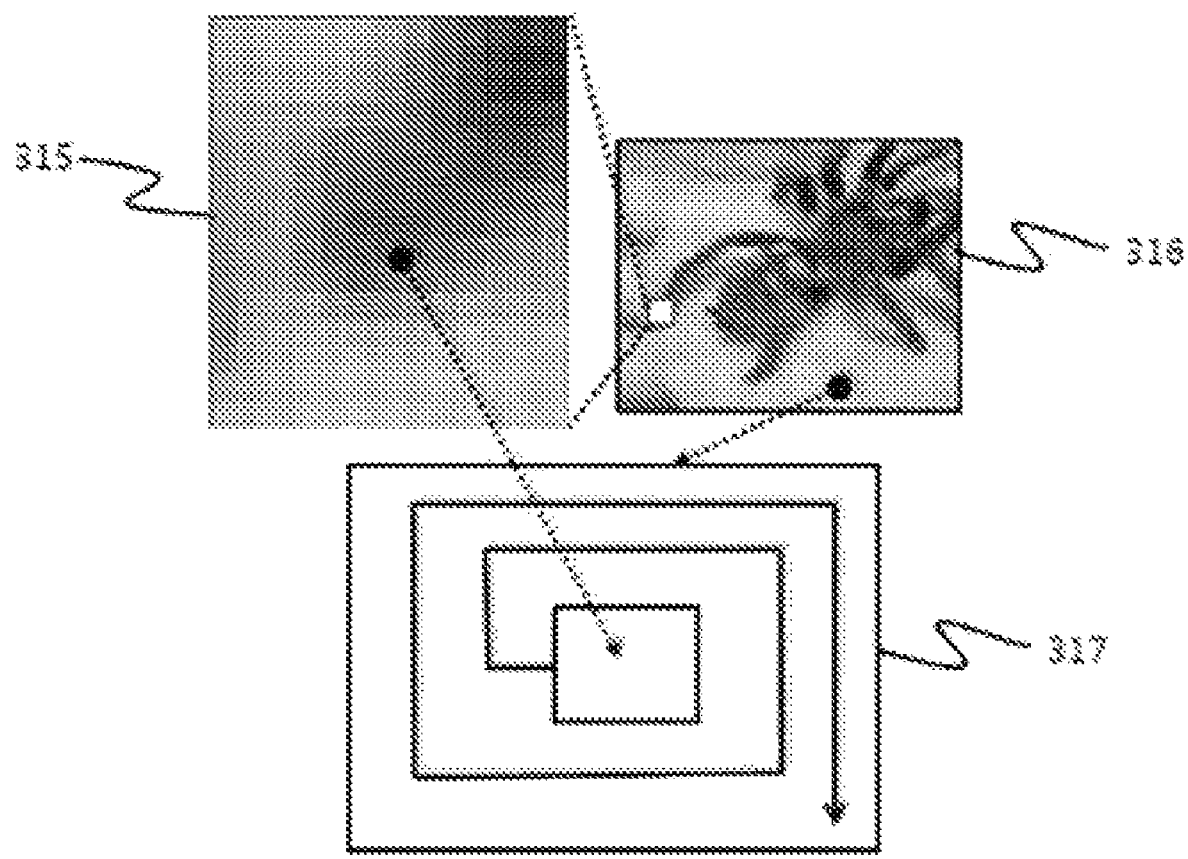

FIGS. 3a and 3b are block diagrams illustrating a flow of searching changes of location coordinates values by tracking digital markings on image data of the present invention. First, marked data IDs are withdrawn to perceive changes of location coordinates values of digital markings from consecutive image frames (S301), and peripheral image patterns of the corresponding IDs are withdrawn (S303). The peripheral image patterns are stored as normal RGB values by peripheral image information of positions marked on the corresponding image frames, and background values are removed to track a location of an object easily. As for matching of the peripheral image patterns, 95% (or lower than 95%) of a numerical value is used instead of 100%, thereby avoiding inconsistency of images in accordance with concentration of light.

A total of four steps are performed to find out locations of markers from a next image frame by using the peripheral image patterns stored in a peripheral image storage. A step 1 (S307) moves to a left 1-pixel position from the current position (S309), and the step is increased as "1" (S323), then it is decided whether matched peripheral image patterns exist (S305). If so, the corresponding location coordinates values and the peripheral image patterns are stored (S325), and if the matched peripheral image patterns do not exist, a step 2 (S311) is carried out. The step 2 moves to an upper end 1-pixel position from the current position (S313), and the step is increased (S323). If matched patterns do not exist, a step 3

(S315) is conducted. If the matched peripheral image patterns exist, the corresponding location coordinates values and the peripheral image patterns are stored (S325). The step 3 moves to a right 1-pixel position from the current position (S317), and the step is increased (S323). If matched peripheral image patterns exist, the corresponding location coordinates values and the peripheral image patterns are stored (S325). If the matched patterns do not exist, a step 4 is performed, and moves to a lower end 1-pixel position from the current position (S319), then the step is set to 1 (S3210 to carry out the step 1 again. If the matched peripheral image patterns exist, the corresponding location coordinates values and the peripheral image patterns are stored (S325).

When locations of the patterns are moved as 1 pixel, the patterns return to the original place. If this process is executed by increasing repetition times in every step, a marked pattern location searching process circulates in a spirally emitting direction to find out marked image pattern locations, like shown in FIG. 3b. That is, since various sheets of consecutive image frames (316) are connected in image data, a location of an object slightly changes to a next-step image frame from a previous-step image frame. Therefore, if pattern searching is progressed as moving in spiral shape by using peripheral image patterns (315) stored in a previous step, locations of changed markings can be easily searched.

There may be a method of fixing a camera and a method of moving it when the consecutive image frames are obtained. If a first camera has a moving type, x (horizontal axis) and y (vertical axis) values where the camera moves are essential, and here, a distance between the camera and an object which has a z value should be regular. It is because calculation is difficult owing to size changes if the z value changes. Suppose that the x (horizontal) axis where the camera moves is called Cx and the y (vertical) axis where the camera moves is called Cy. The second method of fixing the camera can be explained like camera moving distance Cx=0 and Cy=0.

A horizontal coordinate of the central point of the corresponding image frames is X and a vertical coordinate thereof is Y. As for the coordinates X and Y of the central point, coordinates (x,y) which are separated as a Y value toward the y axis and as an X value toward the x axis based on a left upper part (0,0) of FIG. 4a, which is the central point of the corresponding image frames, become the coordinates X and Y of the central point.

At this point, when a distance in which the camera moves is reflected, a new central point would be expressed in an Equation 1.

$$X = X - Cx,$$

$$Y = Y - Cy$$ [Equation 1]

If the camera moves in a positive direction, the object should be revised as if it moved backward, thus location information of the camera is subtracted. As a result, it is possible to find an exact central point by revising location changes of the camera through the Equation 1 of the coordinates X and Y.

Another point to be considered is that size of the consecutive image frames is not regular. For instance, if the central point (X,Y) is different from a next image frame based on the starting point (0,0) owing to generation of distortion of the image frames, given that central coordinates of the current image frame are (X2,Y2) and central coordinates of a previous image frame are (X1,Y1), a distortion ratio dX of the X direction and a distortion ratio dY of the Y direction of the consecutive image frames are given in an Equation 2.

$$dX = \left(\frac{X_2 - X_1}{X_2}\right) s X_1,$$

$$dY = \left(\frac{Y_2 - Y_1}{Y_2}\right) s Y_1$$ [Equation 2]

When the obtained dX and dY values are added to location coordinates values of digital markings of a new frame, revision is finished. That is, even though the camera moves or screen distortion occurs, the central point can be at the same position even on any image frame.

Figure 4A:
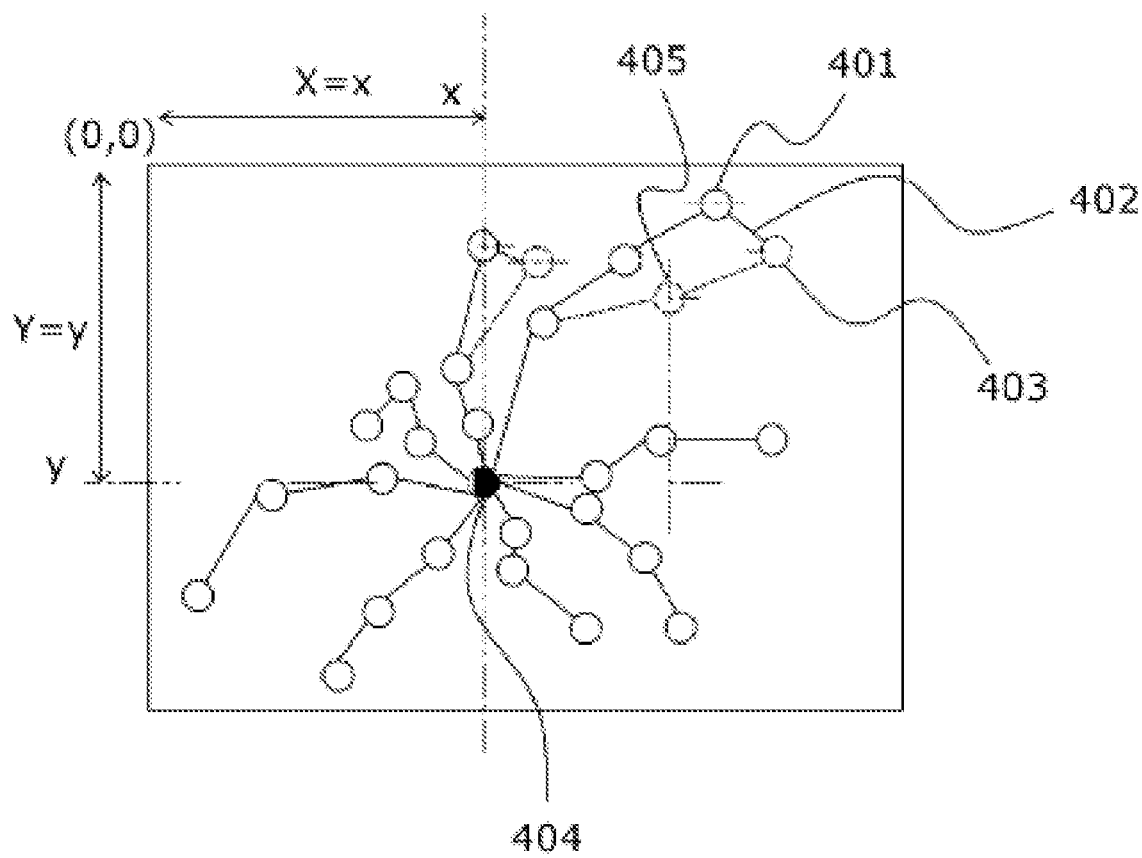
FIGS. 4a and 4b show a method of extracting angles from coordinates location values of digital markings perceived from consecutive image frames.
Figure 4B:
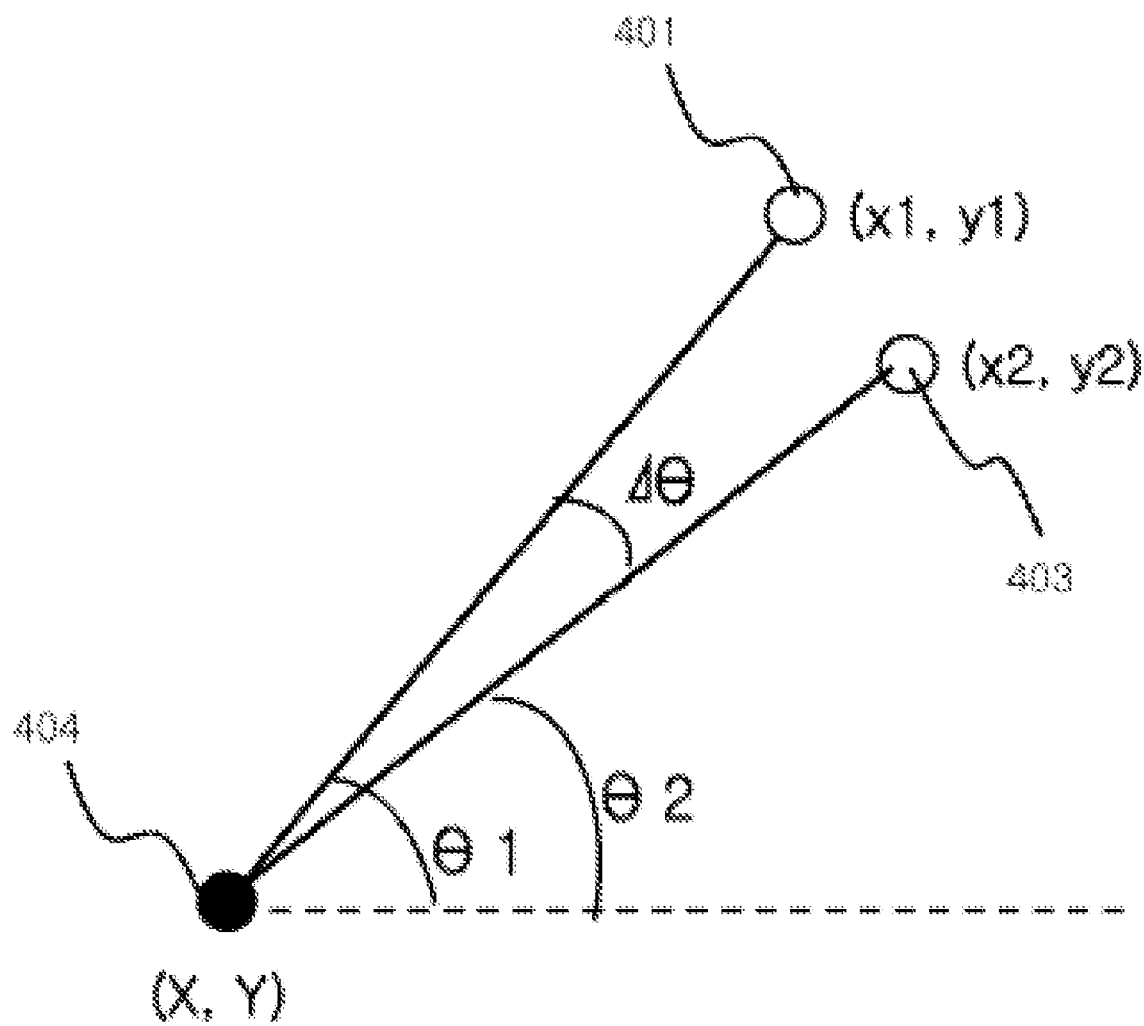

FIGS. 4a and 4b show a method of extracting angles from coordinates location values of digital markings perceived from consecutive image frames. Like the explanation of FIG. 3, location coordinates values of each joint (digital markings) are calculated from peripheral image patterns of the digital markings. As mentioned before, distances in which the central point moves from the consecutive image frames should be perceived. If the moved distances are subtracted from each piece of marked information after distances x and y where the central point moves are obtained by using the marked central point, overlapped marking information is generated from the consecutive image frames like shown in FIG. 4a. After the central points are matched together, if coordinates of a marked position (405) and a position (404) of the central point are applied to an equation of a trigonometrical function from location coordinates values of a digital marking (403) of the current image frame and location coordinates values of a digital marking (401) of a previous image frame, moved angles can be calculated. And, speed for movement can be also calculated by using the angles and the distances.

FIG. 4b is a diagram for illustrating an example of calculating moving angles between the location coordinates values of the digital marking (403) of the current image frame and the location coordinates values of the digital marking (401) of the previous image frame, as well as the central point in FIG. 4a. Like shown in FIG. 4b, by using the location coordinates values (x1,y1) of the digital marking (401) of the previous image frame and the coordinates values (X,Y) of the central point (404), a value of an angle θ1 formed by the coordinates values (X,Y) of the central point (404) and the location coordinates values (x1,y1) of the digital marking (401) of the previous image frame can be obtained. If the location coordinates values (x2,y2) of the digital marking (403) of the current image frame and the coordinates values (X,Y) of the central point (404) are used, a value of an angle θ2 formed by the coordinates values (X,Y) of the central point (404) and the location coordinates values (x2,y2) of the digital marking (403) of the current image frame can be obtained. Through a difference between the angles θ1 and θ2, it is possible to acquire a moved angle (×θ) between the location coordinates values of the digital marking (403) of the current image frame and the location coordinates values of the digital marking (401) of the previous image frame based on the central point (X,Y). When necessary, by excluding the first location coordinates values (x1,y1) from the second location coordinates values (x2,y2), a moved distance (402) on the coordinates xy can be obtained.

FIG. 5 is a format diagram showing a motion template generated by the present invention. When angles are calculated on location coordinates of digital markings, the angles are fixed by depending on initial positions. Once the initial angular values are fixed, operational errors may be generated according to initial values of a robot during application to the robot. So, based on location coordinates values of a first digital mark, an angular value of a digital mark of a next frame is subtracted to maintain a relative value. The motion template consists of a leg number (501), frames (502), leg order (503), joint order (504), and data values (505). The leg number (501) and the frames (502) are variably expanded according to image data and the number of legs of an object. The data values (505) are composed of angular values and speed, and at this time, angles are relative angular values changing based on θ, and time taken during motion is shown as S symbols and refers to a time consumed to move an angle of a digital marking of a next frame from the corresponding frame.

For example, as for a leg number 1 and template values of a frame 1, a frame 2, and a frame 3 of a joint 1 in the motion template of FIG. 5, it is known that they are marked in "θ+0 (S=0)", "θ+2 (S=5)" and "θ+3 (S=5)", respectively. That is to say, a first joint of a first leg has an angular value θ (may be considered as a random reference value) on the frame 1, and movement to the frame 2 from the frame 1 means that an angular value moves as 2 degrees (°) from θ. At this moment, motion time displays that "0sec" is taken. Movement to the frame 2 from the frame 2 means that an angular value moves as 3 degrees (°) from θ, and at this time, the motion time means that "5sec" is taken. Namely, motion speed per second is 3-degree (°)/5sec. In this case, it is impossible to move within "0sec" in a physical sense, but this can be interpreted like the corresponding digital marking instantly moves at maximum speed without delay as possible.

Figure 6:
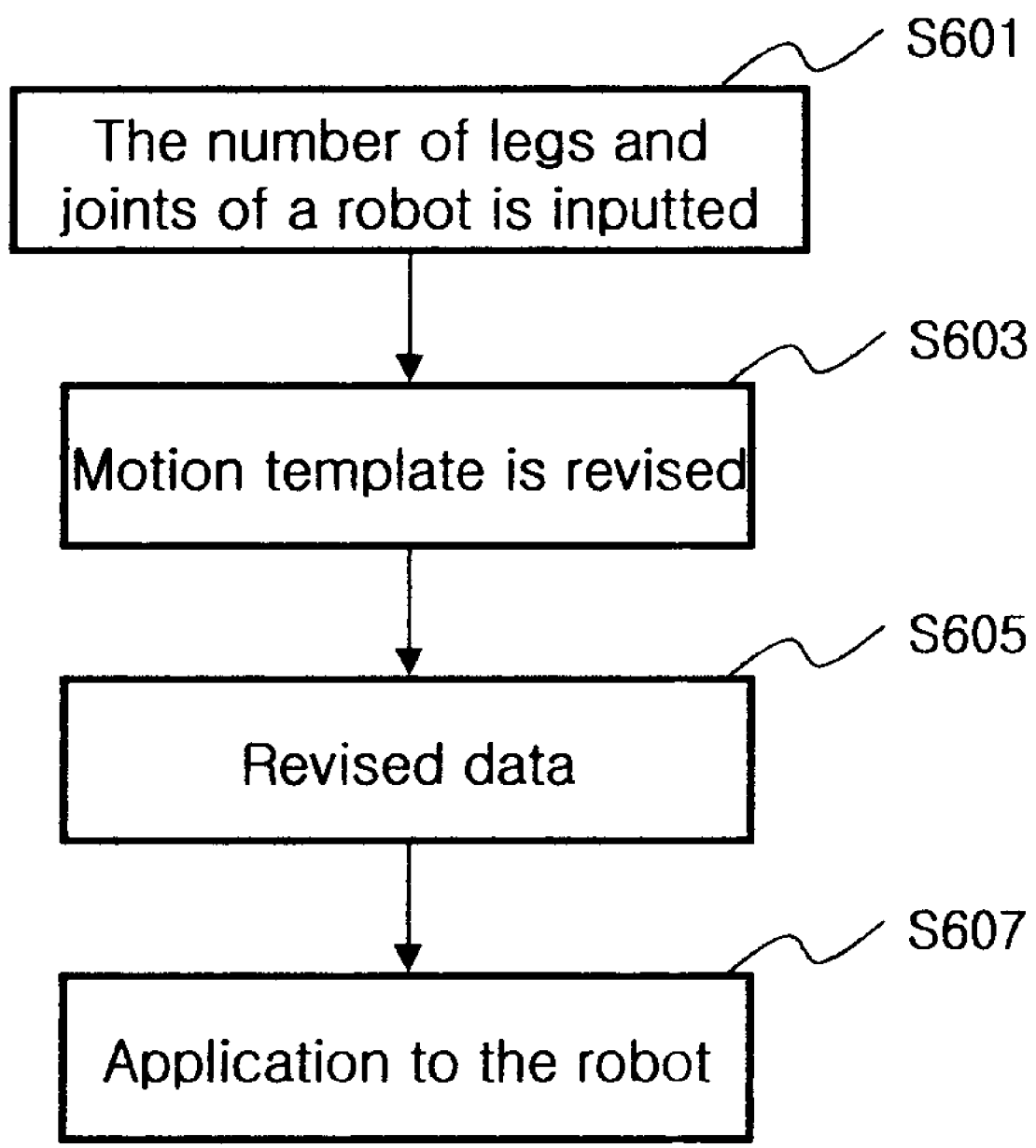
FIG. 6 is a flowchart for applying motion template data of the present invention to a robot.

FIG. 6 is a flowchart for applying motion template data of the present invention to a robot. Since the number of legs and joints of an object extracted from image data is different from the number of legs and joints of the robot to be substantially applied, a processing procedure for compensating the difference should be performed. First, when the number of the legs and the joints of the robot is inputted (S601), motion template revision is executed according to the number of the legs and the joints of the robot (S603). Next, revised data is generated (S605), and is applied to the robot (S607).

There are various methods of revising the motion template data according to the number of the legs and the joints of the robot, but in the present invention, the most widely used method will be explained in a simple way. If the number of joints of a robot to be applied is larger than the number of joints of motion data, linear interpolation is applied. And, if the number of the joints of the robot to be applied is smaller than the number of the joints of the motion data, joint data of the motion data is deleted as many as the number of the joints. That is to say, if the number of the legs of the robot is larger than the number of the legs of the motion data, linear interpolation is applied, but if the number of the legs of the robot is smaller than the number of the legs of the motion data, leg data of the motion data is deleted as many as the number of the robot's legs.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A robot action data generation method for perceiving motion of an object from a consecutive first image frame, a second image frame . . . an Nth image frame including image information on the moving object, and for generating robot action data from the perceived motion, comprising the steps of:
    a first step of performing digital markings at plural spots on top of the object of the first image frame, and storing first location coordinates values of the digital markings in tree type;
    a second step of storing peripheral image patterns of each digital marking in association with the first location coordinates values;
    a third step of recognizing image data identical with peripheral image patterns of each of the first location coordinates values from the second image frame, and finding out changed second location coordinates values from the first location coordinates values;
    a fourth step of extracting angle changes of each location coordinates value from the first location coordinates values and the second location coordinates values;
    a fifth step of converting extracted angles into motion templates;
    a sixth step of repeatedly applying the second step to the fifth step up to the Nth image frame; and
    a seventh step of generating robot action data from the motion templates.

2. The robot action data generation method of claim 1, wherein one central point is designated in the first step, and the location coordinates are stored in the tree type based on the central point.

3. The robot action data generation method of claim 1, wherein positions digitally marked on top of the object are joints of the object.

4. The robot action data generation method of claim 2, wherein between the second step and the third step, a 2-1st step is further comprised to revise a central position of the first frame and a central position of the second frame by compensating moving distances between the central point and moving distances (Cx,Cy) of a camera.

5. The robot action data generation method of claim 1, wherein the third step is to find out the second location coordinates values in spiral direction from the first location coordinates values.

6. The robot action data generation method of claim 1, wherein the motion templates store changed quantities of the second coordinates values changed from the first coordinates values, angles, and a time taken for changing the corresponding angles.

7. A robot action data generation apparatus for perceiving motion of an object from a consecutive first image frame, a second image frame . . . an Nth image frame including image information on the moving object, and for generating robot action data from the perceived motion, comprising:
    a first memory for storing image data consisting of plural frames;
    a second memory for performing digital markings for image data which constitutes the first image frame stored in the first memory, and storing first location coordinates values of the digital markings and peripheral image patterns of each digital marking in association with the first location coordinates values; and
    an operation processor for finding out changed second location coordinates values from the first location coordinates values by recognizing image data identical with the peripheral image patterns of each of the first location coordinates values from the first image frame and the consecutive second image frame, extracting angle changes of each location coordinates value from the first location coordinates values and the second location coordinates values, converting the extracted angles into motion templates, and for generating robot action data from the motion templates.

* * * * *